April 17, 1951 H. K. JOHNSON 2,549,608
HAND WEEDING AND CULTIVATING TOOL
Filed June 7, 1947
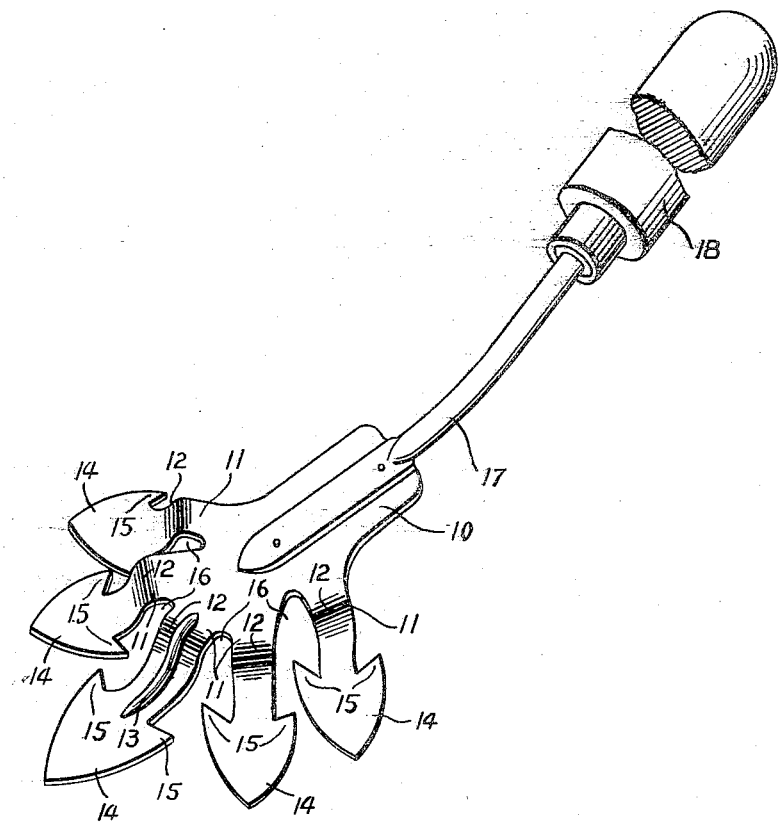
INVENTOR
HUBERT K. JOHNSON
BY
ATTORNEY Patented Apr. 17, 1951

2,549,608

UNITED STATES PATENT OFFICE 2,549,608

HAND WEEDING AND CULTIVATING TOOL

Hubert K. Johnson, Southport, Conn.

Application June 7, 1947, Serial No. 753,213

2 Claims. (Cl. 97—63)

This invention relates to weeding devices, and particularly to the type that is operated by a push and pull or oscillating movement while slowly advancing over the area to be treated. It finds particular application in weeding gardens where it is advantageous to loosen and till the soil in the vicinity of the plants about which weeding is necessary.

Objects of the invention include the provision of a push-pull weeding device that will tend to withdraw weed stems and their roots from the soil intact, rather than to sever the stems from the roots; the provision of such a weeding device that will automatically loosen and till the soil around the weed and engage its stem slightly below the ground surface; the provision of such a weeding device that will provide a plurality of entrapping pockets which permit ready ingress for weed stems, but difficult egress therefrom; the provision of such a weeding device having a guiding portion that is adapted to rest on the top of the ground and a member or members that probe beneath the ground surface for loosening the soil about the weed preparatory to withdrawing it; the provision of such a weeding device having radiating tines in one plane and an integral guiding member in a spaced parallel plane, and wherein the free ends of the tines are provided with probing heads that form entrapping pockets with adjacent such heads; and the provision of such a weeding device that is effective to remove weeds when reciprocated in all directions without turning the weeder angularly whereby the operator may stand in one position and reciprocate the weeder not only in a forward, but a sidewise manner without angularly turning the weeder.

The above, as well as other objects and novel features of the weeding device will become apparent from the following specification and accompanying drawing, in which:

The single figure represents a perspective view of the new and improved weeding device.

Referring to the drawing, the weeding device comprises a hand-shaped implement having a palm member or plate 10 that is adapted to rest upon and slide along the ground to be weeded. A plurality of tines 11 radiate from the member 10. There may be as many tines 11 as desired, and although only five are shown that radiate semi-circularly, it is within the scope of this invention to provide tines 11 that radiate entirely about the member 10 circularly. Each tine is provided substantially centrally of its length with a reverse bent portion 12 so that the forward free ends of all tines are located in a single plane that is parallel to, but spaced from the plate 10. This construction permits the free ends of the tines to be guided along a plane at a substantially fixed distance below the ground surface on which the plate 10 rides. A reenforcing web 13 extends along the upper surface of the central, longest tine from a point substantially in front of the reverse bent portion 12 to a point substantially behind said portion. The reverse bent portions 12 serve to till the soil and loosen it about the weeds to be extracted since the earth is caused to pass up over the portions 12 and through the spaces between adjacent tines.

A probing head 14 is provided at the free end of each tine 11. Each of the heads 14 includes hooked-shaped flanges or barbed portions 15 having surfaces that form angles less than 90° with the tines with which they are associated. The tines 11 radiate for increasing distances from each side of the member 10 to the middle tine which extends farthest. The construction and arrangement of the tines 11 and the probing heads 14 are such that the flanges or barbed portions 15 on adjacent tines overlie, and form with the edges of their corresponding tines entrapping pockets 16. The edges of the probing heads 14, as well as those of the tines, are blunt whereby the weed stems are not severed. The overlying flanges 15 on adjacent tines provide ready ingress of the weed stems to the pockets 16, but difficult egress therefrom, and the combined effect of the curved portions 12, flanges 15 and dull edges is to loosen the soil about the weed roots below the earth's surface and to entrap and withdraw the weed from the soil without necessarily severing its root therefrom as the operator effects a reciprocating action of the weeder.

A handle-receiving portion or shank 17 is integrally attached to the portion of plate member 10 remote from the tines 11 and it extends backwardly therefrom substantially at a 45° angle thereto. A relatively long handle 18 is attached to the portion 17 so that an operator may reciprocate the weeder from a standing position. Of course, a short handle can be provided for using the device in a crouching or kneeling position.

As previously explained, plate 10 may be provided with tines 11 radiating throughout 360 degrees thereof, in which case the angularly-disposed portion 17 would extend from the center of plate 10 instead of the rear portion thereof.

From the foregoing it is evident that the weeding device can be used from a crouching, kneeling or standing position. With the plate member 10 on the top of the ground and the probing heads 14 beneath the ground, reciprocation of the weeder in any direction can be accomplished effectively without angularly turning the weeder. Furthermore, an oscillating action can be employed, as well as a direct reciprocating movement, and in each case, the ground about the weeds is loosened and the weeds and their roots effectively extracted.

Although the principles of the new and improved weeder have been shown and described as applied to one embodiment of the invention, it will be evident that numerous features may be used without others without departing from the principles of the invention.

What is claimed is:

1. In a horticultural device, a ground-engaging plate; headed tines attached to said plate, the heads of which are arranged on progressively increasing radii from a point within said plate; and barbed inner portions on each head, the adjacent barbed inner portions of adjacent heads intersecting a common line radiating outwardly from a point within said plate.

2. In a horticultural device, a ground-engaging plate; headed tines attached to said plate, the heads of which are arranged on progressively increasing radii from a point within said plate and in a common plane parallel to, but spaced from said ground-engaging plate; and barbed inner portions on each head, the adjacent barbed inner portions of adjacent heads intersecting a common line radiating outwardly from a point within said plate.

HUBERT K. JOHNSON.

REFERENCES CITED

The following references are of record in the file of this patent:

UNITED STATES PATENTS

| Number | Name | Date |
|---|---|---|
| 602,425 | Brown | Apr. 19, 1898 |
| 975,058 | Mehler | Nov. 8, 1910 |
| 2,010,303 | Hopley | Aug. 6, 1935 |